(12) United States Patent
Wiedemann

(10) Patent No.: US 10,150,619 B2
(45) Date of Patent: Dec. 11, 2018

(54) CLEARING DEVICE FOR CLEARING DIRT REMOVAL CONTAINER OF SEWER AND STREET CLEANING VEHICLE

(71) Applicant: Karl Wiedemann, Welden (DE)

(72) Inventor: Karl Wiedemann, Welden (DE)

( * ) Notice: Subject to any disclaimer, the term of this patent is extended or adjusted under 35 U.S.C. 154(b) by 230 days.

(21) Appl. No.: 15/199,360

(22) Filed: Jun. 30, 2016

(65) Prior Publication Data
US 2016/0311624 A1    Oct. 27, 2016

Related U.S. Application Data

(63) Continuation of application No. PCT/EP2015/000485, filed on Mar. 4, 2015.

(30) Foreign Application Priority Data

Mar. 7, 2014    (DE) .......................... 10 2014 003 018

(51) Int. Cl.
*B65G 33/08* (2006.01)
*B65D 88/54* (2006.01)
(Continued)

(52) U.S. Cl.
CPC ........... *B65G 33/08* (2013.01); *B65D 88/546* (2013.01); *B65G 65/466* (2013.01); *E03F 7/10* (2013.01); *E03F 9/00* (2013.01)

(58) Field of Classification Search
CPC ......... B65G 33/08; B65G 65/466; E03F 7/10; E03F 9/00; E01H 1/042; B65D 88/546
See application file for complete search history.

(56) References Cited

U.S. PATENT DOCUMENTS

| 3,052,908 A * | 9/1962 | Daneman | ............... B65F 3/0209 |
| | | | 15/340.1 |
| 4,393,537 A * | 7/1983 | Reprogle | ................ A47L 11/24 |
| | | | 15/340.2 |

(Continued)

FOREIGN PATENT DOCUMENTS

| DE | 222585 C | 4/1909 |
| DE | 88 458 A | 3/1972 |

(Continued)

OTHER PUBLICATIONS

Translation of written opinion dated Jun. 30, 2016 of international application PCT/EP2015/000485 on which this application is based.
International Search Report dated Jun. 5, 2015 of international application PCT/EP2015/000485 on which this application is based.

*Primary Examiner* — Saul Rodriguez
*Assistant Examiner* — Ashley K Romano
(74) *Attorney, Agent, or Firm* — Ewers & Hasselmann PLLC

(57) ABSTRACT

A sewer and/or road cleaning vehicle is provided. The cleaning vehicle includes a dirt removal container with a central longitudinal barrel axis, container walls and a container bottom. The dirt removal container has a shape of a barrel and is arranged to accommodate and transport mineral dirt residues collected during cleaning. A clearing device is provided to empty out the dirt removal container. The clearing device includes a conveying screw and is arranged on a carrier inside the dirt removal container. The carrier is pivoted around the central longitudinal barrel axis by a pivoting drive so that the conveying screw is laterally deflected in a first and in a second direction along the container walls relative to a center position associated with the container bottom. A discharge screw assembly is arranged downstream of, and transversely to, the conveying screw to discharge the mineral dirt residues outwardly.

16 Claims, 1 Drawing Sheet

(51) Int. Cl.
*E03F 7/10* (2006.01)
*E03F 9/00* (2006.01)
*B65G 65/46* (2006.01)

(56) References Cited

U.S. PATENT DOCUMENTS

| | | | | |
|---|---|---|---|---|
| 6,379,547 | B1 * | 4/2002 | Larsson | E03F 7/10 |
| | | | | 210/609 |
| 6,438,792 | B1 * | 8/2002 | Cappellotto | E03F 7/10 |
| | | | | 15/302 |
| 6,790,368 | B1 * | 9/2004 | Vachon | E03F 7/10 |
| | | | | 15/340.1 |
| 8,377,221 | B1 * | 2/2013 | Taylor | E03F 7/10 |
| | | | | 134/21 |
| 8,889,000 | B2 * | 11/2014 | Hannemann | E03F 5/16 |
| | | | | 210/170.03 |
| 2007/0163938 | A1 * | 7/2007 | Davis | B08B 9/04 |
| | | | | 210/241 |
| 2012/0204366 | A1 * | 8/2012 | Arsenault | E01H 1/042 |
| | | | | 15/84 |
| 2014/0262993 | A1 * | 9/2014 | Bossom | E03F 9/00 |
| | | | | 210/121 |
| 2016/0311624 | A1 | 10/2016 | Wiedemann | |

FOREIGN PATENT DOCUMENTS

| | | |
|---|---|---|
| DE | 195 38 846 A1 | 4/1997 |
| DE | 102014003018 A1 | 9/2015 |

* cited by examiner

CLEARING DEVICE FOR CLEARING DIRT REMOVAL CONTAINER OF SEWER AND STREET CLEANING VEHICLE

CROSS REFERENCE TO RELATED APPLICATIONS

This application is a continuation application of international patent application PCT/EP2015/000485, filed Mar. 4, 2015, designating the United States and claiming priority from German application 10 2014 003 018.0, filed Mar. 7, 2014, and the entire content of both applications is incorporated herein by reference.

FIELD OF THE INVENTION

The invention relates to a sewer cleaning vehicle and/or street cleaning vehicle. The vehicle includes at least one barrel-shaped dirt removal container for accommodating and transporting mineral dirt residues that arise during sewer cleaning and/or street cleaning, and a clearing device for clearing out the dirt removal container. The clearing device includes at least one rotationally driveable conveying screw. The conveying screw is provided inside the dirt removal container and extends in a longitudinal direction of the dirt removal container. A discharge screw assembly arranged thereafter can be actuated by the conveying screw, with which an outlet for the bulk material is associated.

BACKGROUND OF THE INVENTION

A sewer cleaning vehicle of the kind mentioned above is known from DE 195 38 846 A1. The conveying screw provided in the dirt removal container is arranged in this known arrangement in a stationary manner in the region of the container bottom. Reliable clearance of the dirt removal container only occurs when the container filling automatically slips downwardly to the conveying screw operating in the region of the container bottom. Experience has shown that this is often not the case because the material which forms the filling of the dirt removal container and consists of sedimented mineral dirt residues forms lumps and bridges. There is a likelihood in the known arrangement that the conveying screw arranged in the region of the container bottom runs out of material and subsequently runs empty, so that the material not situated in the direct area of action of the conveying screw is not removed. The discharge screw assembly arranged downstream of the conveying screw is arranged in extension of the conveying screw and is therefore only reliably supplied with material as long as the conveying screw is in alignment therewith, which exacerbates the aforementioned disadvantage even further. The known arrangement has therefore proven itself to be inadequately reliable and therefore often requires laborious manual intervention.

An apparatus for unloading ships is known from DE 222 585 A. The apparatus includes a conveying screw which extends in a longitudinal direction of the cargo hold and which is capable of oscillating about an axis parallel to the screw axis for the purpose of better covering the entire cargo hold. The cargo of the ship, however, is dry bulk material. Furthermore, the removal of the cargo occurs in an upward direction.

SUMMARY OF THE INVENTION

It is thus an object of the present invention to improve an arrangement of the kind mentioned above in a simple and cost-effective manner so that a dirt removal container is discharged reliably.

The object is achieved by providing a cleaning vehicle including: at least one dirt removal container having a central longitudinal barrel axis extending in a longitudinal direction of said at least one dirt removal container, container walls and a container bottom; said at least one dirt removal container having a shape of a barrel and being arranged to accommodate and transport mineral dirt residues collected during cleaning; a clearing device configured to empty out the at least one dirt removal container; said clearing device including at least one rotationally drivable conveying screw; a carrier; said at least one rotationally drivable conveying screw being arranged on said carrier inside the at least one dirt removal container and extending in said longitudinal direction of said at least one dirt removal container; a pivoting drive; said carrier being pivoted by said pivoting drive around the central longitudinal barrel axis extending in the longitudinal direction of said at least one dirt removal container so that said at least one rotationally drivable conveying screw is laterally deflected along the container walls relative to a center position associated with the container bottom in a first direction and in a second direction; said first direction being opposite to said second direction; a discharge screw assembly arranged downstream of, and transversely to, said at least one rotationally drivable conveying screw to receive the mineral dirt residues from said at least one rotationally drivable conveying screw; and, said discharge screw assembly having an outlet to discharge outwardly said mineral dirt residues.

According to an aspect of the invention, at least one conveying screw of the clearing device is accommodated on a carrier arranged pivotably on an axis extending in the longitudinal direction of the container. The carrier can be pivoted by an associated pivoting drive, wherein the conveying screw can be laterally deflected on both sides along the container wall relative to a center position associated with the container bottom. The discharge screw assembly is arranged transversely to the conveying screw which is arranged in the longitudinal direction of the container.

These measures advantageously ensure that that the conveying screw does not run out of material and the formation of a bridge within the container filling is prevented. Instead, the conveying screw of the clearing device is moved continuously to the material to be removed, into which the conveying screw cuts virtually in the direction of its lateral deflection. In this process, the material gripped by the conveying screw and transported in one direction can be removed over the entire pivoting range of the conveying screw, that is, irrespective of its lateral deflection, by the discharge screw assembly arranged transversely to the conveying screw. The discharge screw assembly, which is arranged transversely to the conveying screw, that is, in the direction of the width of the vehicle, extends over the entire width of the dirt removal container and thus engages beneath the entire pivoting range of the conveying screw so that reliable mechanical clearance of the dirt removal container occurs even under difficult conditions.

The deflection of the at least one conveying screw of the clearing device can occur approximately up to the middle height of the container. It is thus ensured that the entire bottom dirt removal container region, which usually has a downwardly constricting cross-section and is therefore very susceptible to the formation of bridges, can be processed by the conveying screw, thus providing an especially high level of reliability.

In the case of a barrel-shaped dirt removal container with a circular cross-section or of a dirt removal container with a circular segment, the at least one conveying screw of the clearing device can be pivotably arranged about an axis corresponding to the central longitudinal barrel axis, wherein a pivot angle of preferably 180° can be provided. These measures allow a very simple and still highly robust configuration.

The bracket-shaped carrier, which accommodates the at least one conveying screw of the clearing device and which is preferably pivotable about an axis corresponding to one of the central longitudinal barrel axes, may include a rotatably mounted shaft, from which the two radial arms protrude on which the conveying screw or conveying screws is or are mounted with their end. The pivotable carrier allows a very simple and robust configuration of the deflection device in the form of a cylinder drive that is actuated by a pressure medium.

According to another aspect of the invention, the bracket-shaped carrier may be accommodated on a supporting frame which is formed on a cross member that traverses the interior space of the container and that is installed in the dirt removal container. This results in a compact configuration in which very little capacity of the dirt removal container is lost. High stability is nevertheless provided.

According to yet another aspect of the invention, the forward feed of the pivoting drive, which is associated with the laterally deflectable conveying screw, is controlled in a force-dependent manner. It is thus ensured that overloading of the conveying screw is prevented, which contributes to a further increase in reliability.

A trough and channel arrangement which leads to an outlet, and which can be actuated by the at least one conveying screw, is associated with the discharge screw assembly arranged transversely to the conveying screw. These measures allow a simple lateral discharge of the bulk material, so that the bulk material can be removed in a compact manner, for example, by a provided container.

The trough arrangement is provided within the dirt removal container, is associated with an inner section of the discharge screw assembly, extends over the entire width of the dirt removal container, and may therefore be actuated by the conveying screw over its entire pivoting range.

According to an aspect of the invention, the end of the screw located at the front in the conveying direction of the conveying screw adjoins a collecting space extending over the width of the dirt removal container, and a section of the discharge screw assembly is arranged transversely to the conveying screw and extends in the bottom region of the collecting space. The collecting space ensures especially high reliability.

BRIEF DESCRIPTION OF THE DRAWINGS

The invention will now be described with reference to the drawings wherein.

DESCRIPTION OF THE PREFERRED EMBODIMENTS OF THE INVENTION

A main area of application of the present invention is sewer and/or road cleaning vehicles with a dirt removal container. The principal configuration and the functionality of arrangements of this kind are generally known and therefore do not require any further explanations in the present context.

Figure 1:
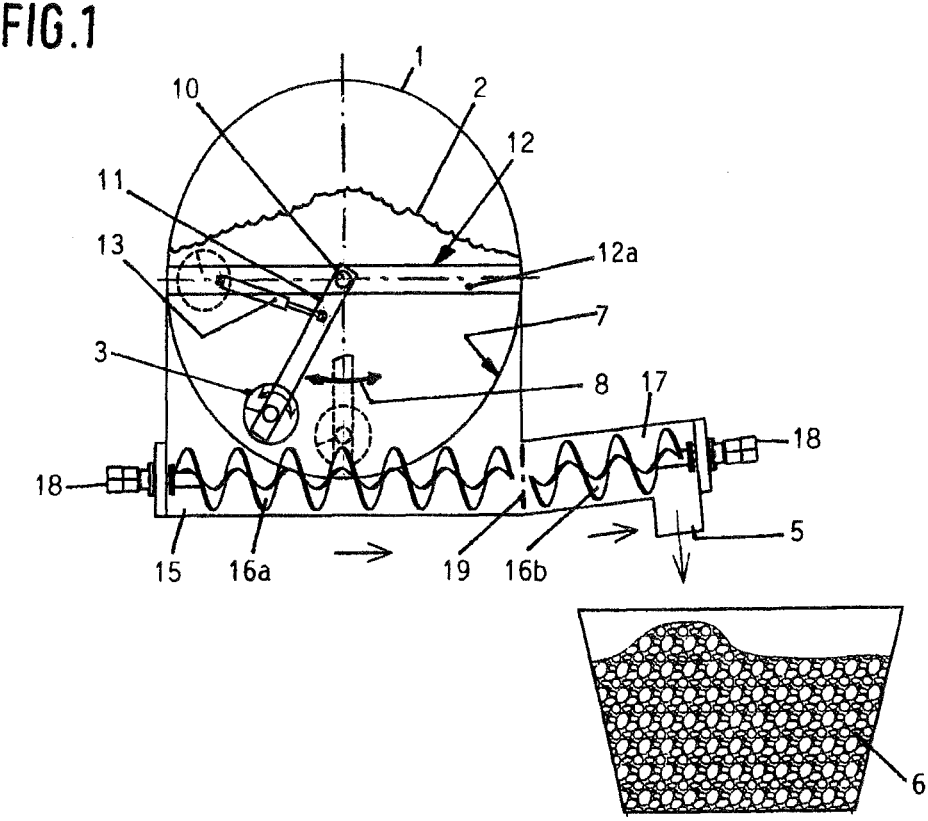
FIG. 1 is a cross-sectional view through a rear region of a dirt removal container of a sewer cleaning vehicle according to an exemplary embodiment of the invention; and, FIG. 2 is a longitudinal sectional view through the arrangement shown in FIG. 1.
Figure 2:
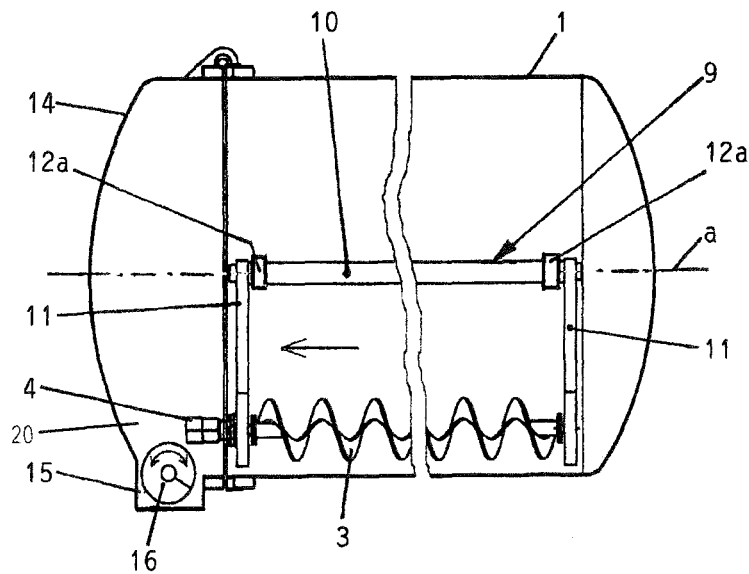

The dirt removal container shown in FIGS. 1 and 2 represents a dirt removal container 1 of a sewer and/or road cleaning vehicle, which is formed in this case as a barrel with a circular cross-section. The vehicle accommodating the barrel and the suction devices et cetera associated with the barrel are omitted in FIGS. 1 and 2. The mineral components of the dirt ejected into the dirt removal container 1 sediment, and accordingly form a filling 2 which rises over time and which is indicated in FIG. 1 by its irregular surface.

For discharging the dirt removal container 1, that is, for clearing the bulk material forming the filling 2 out of the dirt removal container 1, a clearing device is provided which is installed in the dirt removal container 1. The clearing device includes one or more conveying screws 3. FIGS. 1 and 2 show only one conveying screw which extends in a longitudinal direction of the dirt removal container and which is rotatably driveable by the drive motor 4 about its longitudinal axis parallel to a central longitudinal container axis. The drive motor 4 may be implemented as a hydraulic motor acting on one end of the conveying screw 3. The dirt gripped and removed by the conveying screw 3 is supplied to an outlet 5 which is shown in FIG. 1 and which leads to the outside. The outlet 5 can be placed above a provided container 6 which is collected at a later time and into which the dirt may be ejected, that is, removed from the dirt removal container 1. It is also possible to eject the dirt onto a stockpile or a conveyor belt.

The conveying screw 3, which extends substantially over the length of the cylindrical region of the dirt removal container 1, does not permanently operate at the same position of the interior space of the container. Instead, the conveying screw 3 is deflected to both sides of the container to a middle position, which is associated with the container bottom and which is shown in FIG. 1 at the bottom by the dashed line. As a result, the conveying screw 3 is deflected along the adjacent inner surface 7 of the container wall, as indicated in FIG. 1 by the pivot arrow 8. The conveying screw 3 can accordingly move over the inner surface of the container wall which is covered by the filling 2, so that a large catchment area is achieved despite the comparatively small diameter of the screw. The diameter of the conveying screw 3 can therefore be comparatively small in relation to the diameter of the barrel forming the dirt removal container 1, so that a comparatively small overall size is sufficient for the drive motor 4.

In the exemplary embodiment shown in FIG. 1 with a dirt removal container 1 having a circular cross-section, the conveying screw 3 is simply pivotably arranged about an axis corresponding to the central longitudinal container axis a. The pivot angle from an upper end position to the opposite upper end position is 180° in the exemplary embodiment shown in FIG. 1. The conveying screw 3 is accordingly lifted up to the middle container height, as shown in FIG. 1 on the left by the dashed line. It is understood that the aforementioned pivot angle can be adjusted to the conditions in each individual case and it can also accordingly be more or less than 180°, as required in each individual case.

A control device can be provided in dirt removal containers with a non-circular cross-section. The control device scans the progression of the inner container surface and moves the conveying screw 3 or a carrier accommodating the screw according to the progression of the inner surface of the dirt removal container 1.

According to the exemplary embodiment illustrated in FIG. 1, a pivotably arranged conveying screw 3 is accommodated on a bracket-shaped carrier 9, which in this case is pivotably arranged in the dirt removal container 1 about an axis corresponding to the central longitudinal container axis a. The carrier 9 according this exemplary embodiment consists of a rotatably mounted shaft 10 which is arranged coaxially to the container axis a, on which two radial arms 11 are fixed which protrude in the radial direction and on which the associated conveying screw 3 is mounted with its ends. The pivotable carrier 9 is pivotably accommodated on its part on a supporting frame 12 installed in the dirt removal container 1. For the purpose of forming the supporting frame 12, two cross members 12a are provided. The cross members traverse the internal space of the container in the radial direction and are fixed to the container wall 7. The shaft 10 of the carrier 9 is rotatably mounted on the cross member.

According to an exemplary embodiment of the invention, a pivoting unit 13 is associated with the radial arms 11 which accommodate the conveying screw 3 and which are pivotably mounted on the supporting frame 12. As is shown in FIG. 1, the pivoting unit 13 may be a cylinder drive or cylinder unit which is supported on a cross member 12a which forms the supporting frame 12. The supply lines associated therewith can be supported on the supporting frame 12. The supply lines which are associated with the drive motor 4 of the conveying screw 3 can also be installed on the supporting frame 12 and the carrier 9 or the radial arm 11 of the carrier 9 adjacent to the drive motor 4.

In order to prevent an overloading of the conveying screw 3 or of the drive motor 4 associated therewith, the pivoting unit 13 can be associated with a control device which controls the forward pivot feed of the pivoting unit 13 in a force-dependent manner. The conveying screw 3, which is pressed against the filling 2 by the pivoting unit 13, exerts a specific counterforce on the pivoting unit 13. The control as mentioned above can be performed in such a way that the counterforce exerted on the pivoting unit 13 does not exceed a predetermined amount.

As is indicated in FIG. 2, the dirt removal container 1 is provided with a swivel lid 14 at its end at the front in the conveying direction of the conveying screw 3. The conveying direction of the conveying screw 3 is indicated in FIG. 2 by an arrow which faces from the right to the left in FIG. 2. The swivel lid 14 may simply be opened for emptying the dirt removal container 1, so that the material pushed forward by the conveying screw 3 can fall out of the dirt removal container 1 via the open container end. The drive motor associated with the conveying screw 3 is located in the exemplary embodiment at the end of the conveying screw 3 which is at the front in the conveying direction, so that the material pushed forward by the screw is pushed past the drive motor 4 which only has a comparatively small overall size. The same applies to the adjacent radial arm 11 of the carrier 9, which can therefore appropriately be formed in a comparatively slender way.

As is shown most clearly in FIG. 2, the interior space of the swivel lid 14 which converges into the interior space of the dirt removal container is formed as a collecting space 20, which includes a trough-shaped discharge channel 15 at the bottom, which discharge channel is lowered in relation to the bottom of the dirt removal container 1, which in this case is in relation to the bottom of the cylindrical central region of the dirt removal container 1, and which extends transversely in the direction of the vehicle width to the central longitudinal axis a of the dirt removal container 1 and thus also transversely to the conveying screw 3 arranged in the dirt removal container 1, and which is associated transversely to the conveying screw 3 arranged in the dirt removal container 1. The discharge screw assembly 16 is arranged transversely to the container screw, which moves the material dropping into the trough-shaped discharge channel 15 laterally away and to the outlet 5.

According to the exemplary embodiment shown in FIG. 1, the discharge screw assembly 16, which extends in the direction of the vehicle width, is subdivided into two successive sections 16a, 16b, namely into a stationary section 16a which is arranged in the trough-shaped discharge channel 15 provided on the lid site and into a movable section 16b arranged in a tube 17 which is connected to the discharge channel 15 and which includes the outlet 5. The two sections 16a, 16b of the discharge screw assembly are driven by separate drive motors 18, which are associated with mutually averted ends of the sections 16a, b. The drive motors 18 may also be implemented as hydraulic motors, similar to the drive motor 4 of the conveying screw 3.

As is indicated by the interrupted separating line 19, the tube 17 can be removed from the discharge channel 15 provided on the lid side or it can be pivoted away therefrom, so that no impermissible lateral projection remains in the state ready for travelling. During the discharging of the dirt removal container 1 the ejected material still occurs in a desired distance away from the dirt removal container 1 or a vehicle accommodating the material, so that a spacious container 6 can be provided.

According to an exemplary embodiment of the present invention, the tube 17 containing the outlet 5 and the associated section 16b is attached selectively on the left or right to the respective end of the trough-shaped discharge channel 15. The inner section 16a of the discharge screw assembly drive may also be reversed, so that it is directed to the other side. This leads to a respective reversal of the conveying direction of the discharge screw assembly. It is therefore possible to add the container selectively on the left or the right.

The inner trough-shaped discharge channel 15, which is provided upstream of the outer tube 17, extends over a length corresponding to the inner width of the dirt removal container 1 and therefore over the entire horizontal width of the pivoting range of the conveying screw 3. The same also applies accordingly to the width of the bottom region of the aforementioned trough and channel arrangement, which guides the inner section leading to the outlet 5, in form of the collecting space 20 containing the trough-shaped discharge channel 15, whose side walls intersect tangentially from below into the circular circumference of the barrel-shaped dirt removal container 1, as shown in FIG. 1. Engagement beneath the entire pivoting range of the conveying screw 3, which corresponds to the inner width of the dirt removal container 1, occurs through the inner discharge channel 15 and the inner section 16a of the discharge screw assembly associated therewith.

In the aforementioned exemplary embodiment of the invention, the clearing device associated with the dirt removal container 1 only contains one conveying screw 3. It is understood that the clearing device may also be provided with several parallel conveying screws 3, which can either be accommodated on a common pivotable carrier or which can be associated with respectively separate pivotable carriers, to which in this case only one angular section of the entire desired pivot angle of the cooling device can be associated.

It is understood that the foregoing description is that of the preferred embodiments of the invention and that various changes and modifications may be made thereto without departing from the spirit and scope of the invention as defined in the appended claims.

What is claimed is:
1. A cleaning vehicle comprising:
at least one dirt removal container having a central longitudinal barrel axis extending in a longitudinal direction of said at least one dirt removal container, container walls and a container bottom;
said at least one dirt removal container having a shape of a barrel and being arranged to accommodate and transport mineral dirt residues collected during cleaning;
a clearing device configured to empty out the at least one dirt removal container;
said clearing device including at least one rotationally drivable conveying screw;
a carrier;
said at least one rotationally drivable conveying screw being arranged on said carrier inside the at least one dirt removal container and extending in said longitudinal direction of said at least one dirt removal container;
a pivoting drive;
said carrier being pivoted by said pivoting drive around the central longitudinal barrel axis extending in the longitudinal direction of said at least one dirt removal container so that said at least one rotationally drivable conveying screw is laterally deflected along the container walls relative to a center position associated with the container bottom in a first direction and in a second direction;
said first direction being opposite to said second direction;
a discharge screw assembly arranged downstream of, and transversely to, said at least one rotationally drivable conveying screw to receive the mineral dirt residues from said at least one rotationally drivable conveying screw;
said discharge screw assembly having an outlet to discharge outwardly said mineral dirt residues; and
a tube,
wherein:
said discharge screw assembly is a trough and channel arrangement,
said trough and channel arrangement is fed by said at least one rotationally drivable conveying screw with said mineral dirt residues,
said trough and channel arrangement leads to said outlet,
said trough and channel arrangement includes a trough-shaped discharge channel,
said discharge screw assembly includes a stationary section and a movable section,
said stationary section is arranged in said trough-shaped discharge channel,
said trough-shaped discharge channel is provided on the bottom of said at least one dirt removal container in a region of a rear side of said at least one dirt removal container,
said movable section is arranged in said tube,
said tube includes the outlet, and,
said tube is detachably connected to said trough-shaped discharge channel.
2. The cleaning vehicle of claim 1, wherein:
the cleaning vehicle is a sewer cleaning vehicle, and
the mineral dirt residues are collected during sewer cleaning.
3. The cleaning vehicle of claim 1, wherein:
the cleaning vehicle is a street cleaning vehicle, and
the mineral dirt residues are collected during street cleaning.

4. The cleaning vehicle of claim 1, wherein said at least one rotationally drivable conveying screw of said clearing device is deflected in said first and second directions up to a middle height of said at least one dirt removal container.
5. The cleaning vehicle of claim 1, wherein:
said at least one dirt removal container has a circular cross-section or a segment with a circular cross-section; and,
said at least one rotationally drivable conveying screw of said clearing device is pivotable 180° about said central longitudinal barrel axis.
6. The cleaning vehicle of claim 1, wherein
said carrier is formed as a pivot bracket;
said pivot bracket includes a rotatably mounted shaft and two radially protruding radial arms;
said two radially protruding radial arms are fastened on said rotatably mounted shaft; and,
each of said at least one rotationally drivable conveying screw is mounted on one of said two radially protruding radial arms.
7. The cleaning vehicle of claim 1, further comprising a support frame installed in the at least one dirt removal container, wherein:
said carrier has a shape of a bracket;
said carrier is pivotably accommodated on said support frame;
said support frame has cross members; and,
said cross members traverse the interior space of the container.
8. The cleaning vehicle of claim 7, further comprising a drive motor provided on one end of said at least one rotationally drivable conveying screw, wherein:
said at least one rotationally drivable conveying screw is driven by said drive motor; and,
power is supplied to said drive motor via supply lines provided on said carrier and on said support frame.
9. The cleaning vehicle of claim 8, wherein said drive motor is provided on an end of said at least one rotationally drivable conveying screw that is close to said output.
10. The cleaning vehicle of claim 8, wherein said drive motor is a hydraulic motor.
11. The cleaning vehicle of claim 1, wherein:
said pivoting drive is a cylinder drive which is supported on a support frame; and,
power is supplied to said pivoting drive via supply lines provided on said support frame.
12. The cleaning vehicle of claim 1, wherein a forward feed of said at least one rotationally drivable conveying screw is controlled depending on a force in a lateral deflecting direction.
13. The cleaning vehicle of claim 1, wherein said stationary section of said discharge screw assembly provided within said at least one dirt removal container has a length that corresponds to a width of a pivoting range of said at least one rotationally drivable conveying screw.
14. The cleaning vehicle of claim 1, wherein said trough-shaped discharge channel is provided on the bottom of said at least one dirt removal container in a region of a swivel lid associated with said at least one dirt removal container.
15. The cleaning vehicle of claim 1, wherein said stationary section of said discharge screw assembly provided within said at least one dirt removal container has a length that corresponds to a width of said at least one dirt removal container.
16. The cleaning vehicle of claim 1, further comprising a collecting space extending over a width of the at least one dirt removal container, wherein:

a screw end at a front of said at least one rotationally drivable conveying screw adjoins said collecting space in a conveying direction; and, a stationary section of said discharge screw assembly is arranged transversely to said at least one rotationally drivable conveying screw and extends in the bottom region of said at least one dirt removal container to the collecting space.

* * * * *

UNITED STATES PATENT AND TRADEMARK OFFICE
CERTIFICATE OF CORRECTION

PATENT NO. : 10,150,619 B2
APPLICATION NO. : 15/199360
DATED : December 11, 2018
INVENTOR(S) : Wiedemann Page 1 of 1

It is certified that error appears in the above-identified patent and that said Letters Patent is hereby corrected as shown below:

On the Title Page

Item (56), under Foreign Patent Documents, Line 2, change "DE 88 458 A 3/1972" to "DD 88 458 A 3/1972"

Signed and Sealed this
Nineteenth Day of February, 2019

Andrei Iancu
*Director of the United States Patent and Trademark Office*